Jan. 4, 1966     D. RYAN     3,227,594
METHOD AND APPARATUS FOR SPLICING INDEFINITE LENGTH WEBS
Filed Jan. 22, 1962     3 Sheets-Sheet 1
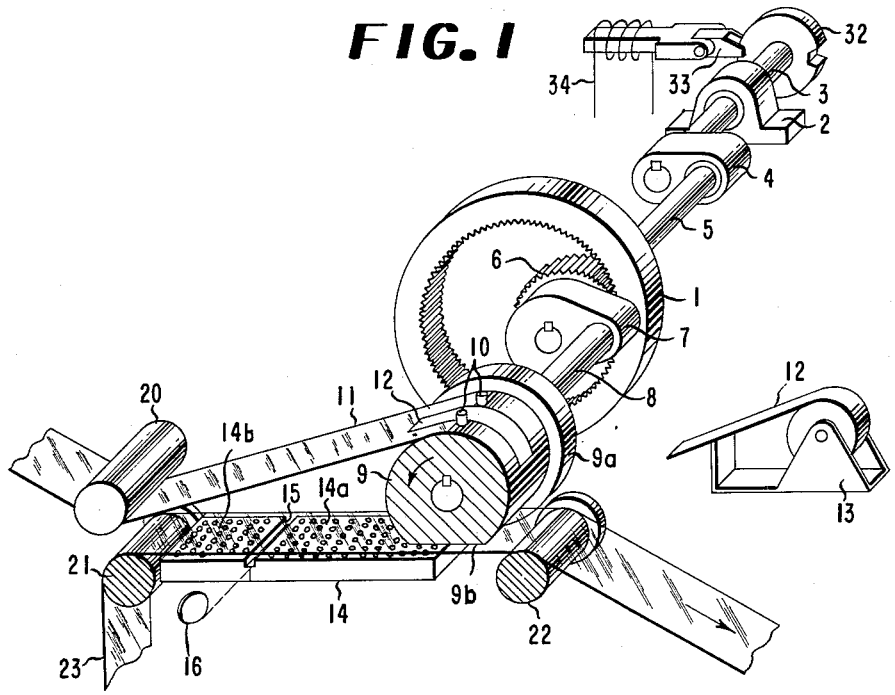
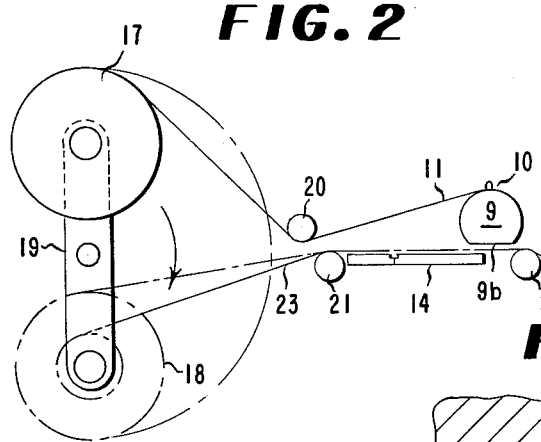
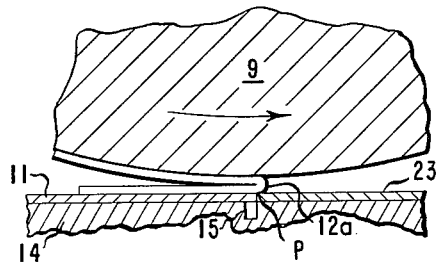
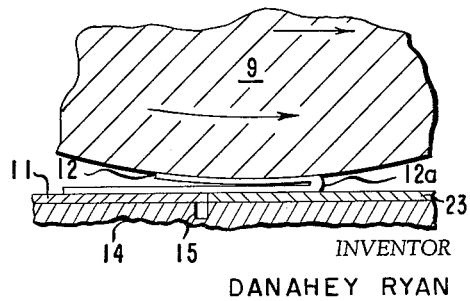
INVENTOR
DANAHEY RYAN
BY Weston B. Wardell Jr.
ATTORNEY

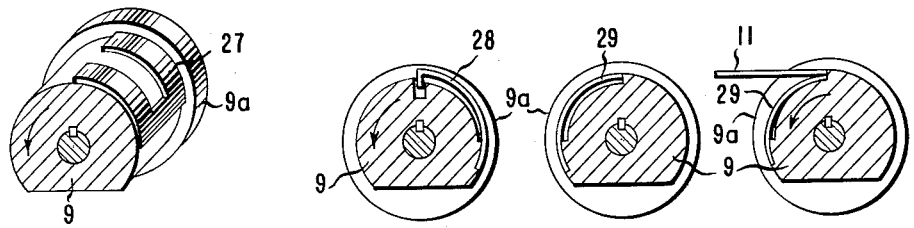
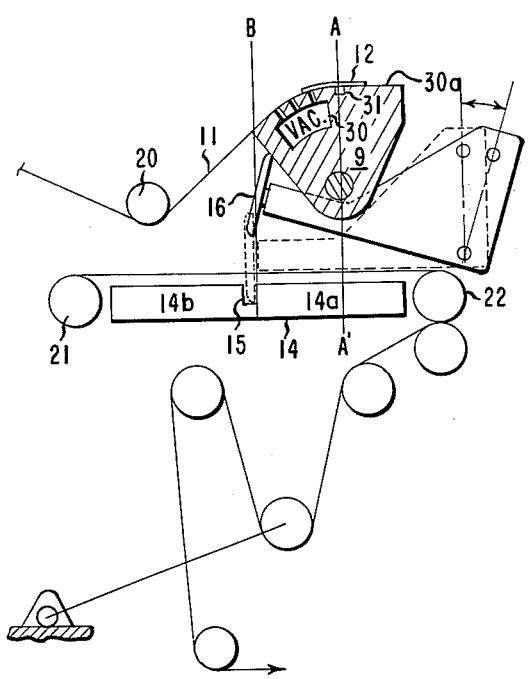
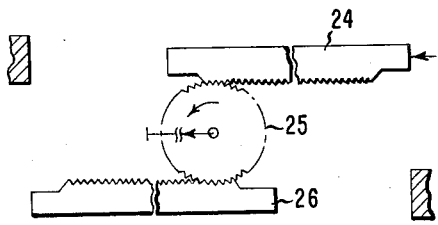
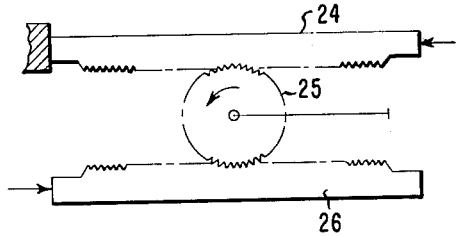
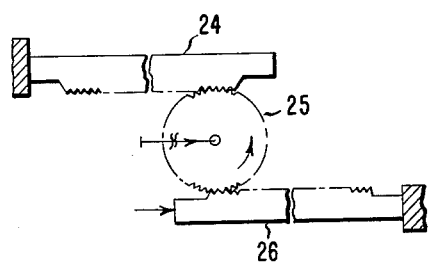
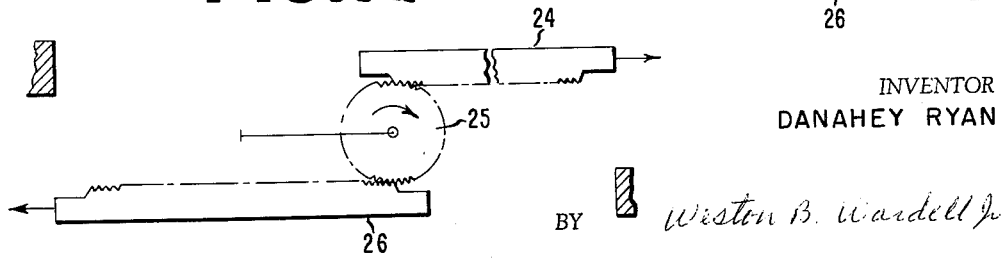

United States Patent Office 3,227,594
Patented Jan. 4, 1966

3,227,594
METHOD AND APPARATUS FOR SPLICING INDEFINITE LENGTH WEBS
Danahey Ryan, Wilmington, Del., assignor to E. I. du Pont de Nemours and Company, Wilmington, Del., a corporation of Delaware
Filed Jan. 22, 1962, Ser. No. 167,583
10 Claims. (Cl. 156—159)

This invention relates to apparatus and a method for processing webs of film. More particularly this invention relates to a novel web-splicing apparatus.

In the preparation of photographic film, e.g., cine film, a transparent base material such as cellulose triacetate, polyester, etc., is coated with several layers of a light-sensitive photographic emulsion including protective coatings. Subsequently the film is slit to standard widths and is wound on a core to form a roll of slit raw stock. Subsequently the raw stock is converted into salable product by perforating one or both edges, continuously inspecting the film, winding a measured length on a core and packaging the film. To permit a continuous operation of these and other steps in film preparation, various components of a "finishing" machine have to be supplied with a continuous length of film regardless of supply roll lengths; this requires the leading end of a new supply roll of raw stock to be spliced to the trailing end of the roll that has expired. The splicing apparatus must be suitable for complete operation in the dark, align the film ends to be spliced within close tolerances and yet be simple in operation.

An object of this invention is to provide a novel splicing and web-fastening apparatus. Another object is to provide such an apparatus which is simple to operate and yet forms splices in which the spliced ends are aligned within close tolerances. A further object is to provide such an apparatus which is versatile as to the type of splice that can be made and the type of web that can be used. A still further object is to provide such an apparatus which is highly reliable and handles and splices webs without damage. Still further objects will be apparent from the following description of the invention.

In the attached drawings which are a part of this application:

FIG. 1 is a perspective view partially in section of an embodiment of the splicing apparatus;

FIG. 2 is a schematic elevational view of the apparatus;

Figure 3A:
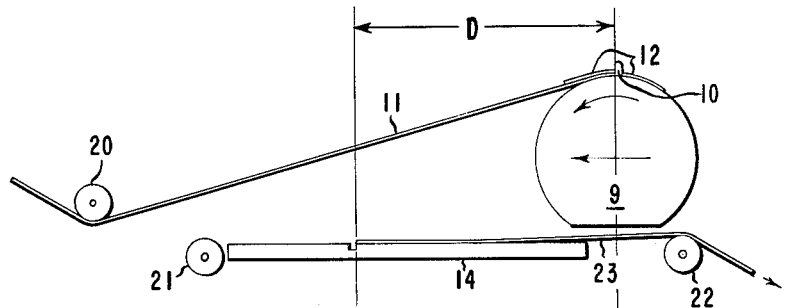

FIGS. 3a, b, c and d are schematic elevational views showing the steps of the splicing operation;

FIG. 4 is a sectional perspective view of an embodiment of the rotatable member and a fixed film locating fixture;

FIG. 5 is a sectional elevational view of another embodiment of the rotatable member;

FIGS. 6 and 6a are sectional elevational views of another embodiment of the rotatable member;

FIGS. 7a, b, c and d are schematic elevational views showing the operation of an embodiment of the translating and rotating means;

FIG. 8 is a schematic elevational view of another embodiment of the apparatus;

FIGS. 9 and 9a are enlarged partial elevational views showing details of a splicing operation.

In the embodiment of the invention shown in FIG. 1, a ring gear 1 is fixedly mounted in a vertical plane to a machine frame (not shown); at the rear of the ring gear, mounted on the machine frame concentric to the ring gear, is a bearing 2. The bearing carries a rotatable shaft 3 to which is keyed a crank arm 4; in the outer end of the crank arm is journaled, e.g., by means of a bushing, a rotatable planet shaft 5. To the planet shaft is attached a planet gear 6 which is in driving relationship with the ring gear in the general embodiment of a cycloidal mechanism. A plate 7 is secured to the end face of the planet gear and carries a fixed shaft 8 to which is operatively secured a rotatable member 9. The planet gear has a pitch diameter equal to one-half the pitch diameter of the ring gear. The radius of the crank arm 4 (or the radial distance between the axes of shafts 3 and 5) equals one-fourth of the pitch diameter of the ring gear. The radius of the plate 7 (or the radial distance between the axes of shafts 5 and 8) equals one-fourth of the pitch diameter of the ring gear.

A preferred embodiment of the rotatable member 9 is shown in FIG. 1. The member is essentially a circular cylinder fitted with flanges 9a (one flange not shown) the cylinder having a flat section 9b parallel to the axis of the cylinder and extending between the flanges. The distance between the flanges is equal to the width of the web to be spliced. If the size of the web is changed, compensation should be made in the size of the roll (e.g., in the distance between the flanges), or alternatively, the end of the film may be trimmed to fit between flanges. An essentially radial pair of spring loaded locating pins 10 project from the upper transfer surface of the rotatable member perpendicular to the flat section 9b, the pins being adapted to be pushed radially inward of the rotatable member so that the outer ends of the pins become flush with the cylindrical transfer surface of the member. The locating pins are spaced laterally from each other along the axis of the rotatable member at a distance less than the width of the end of a new web 11. The flanges and locating pins serve as a means of positioning a new web both laterally and longitudinally on the rotatable member. A piece of pressure-sensitive tape 12 obtained manually from tape source 13 holds the end of the new web in position on the rotatable member and as will be explained below serves to make the splice. The tape source 13 can be a commercially available dispenser having a fixed frame with a fixed serrated knife generally parallel to a horizontal shaft means adapted to hold a roll of tape; in use, the free end of the tape is manually pulled radially away from the roll, being subsequently pulled down against the knife and severed. The tape is placed between the locating pins with approximately half its length adhering to the new web and the remainder to the rotatable member. As shown in FIGS. 4 to 6, other embodiments of the rotatable member can be used in place of the embodiment described above. These will be explained more fully below.

Located to the left of the initial position of the rotatable member is a splicing surface 14, the upper surface of which is located in a horizontal plane at a distance equal to the radius of the rotatable member below the axis of the rotatable member. The splicing surface is positioned to lie essentially between the flanges of the rotatable member 9. The splicing surface is activatable for holding a web in place. Preferably the surface is provided with small holes whereby vacuum (from a source not shown) can be applied. The splicing surface preferably is divided into two sections, a right section 14a and a left section 14b. Dividing the sections is a groove 15 positioned parallel to the axis of the rotatable member and through which a knife 16 for trimming a web passes. The knife is supported by a means (not shown) which preferably is adapted to translate it in a direction transverse to the sections of the splicing surface and through the groove. The knife mechanism can be suitably powered by an air cylinder, electric solenoids, linkages operated by motors, etc.

Figure 3B:
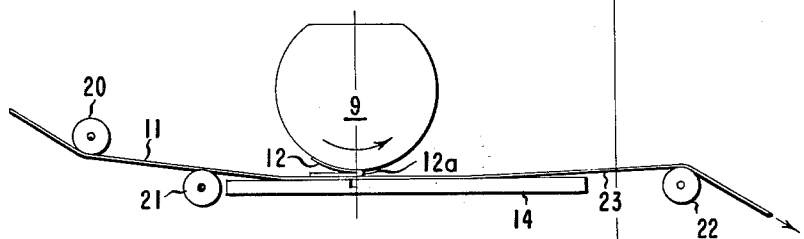
Figure 3C:
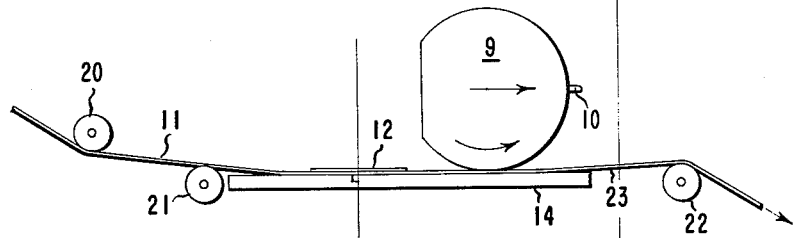
Figure 3D:
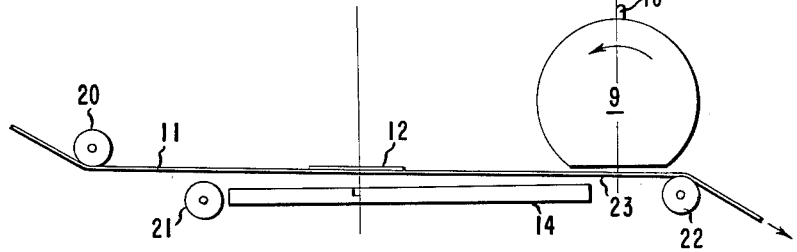

As shown in FIG. 2, new web supply roll 17 and expiring web supply roll 18 are mounted on an indexable support arm 19 so as to be freely rotatable in a vertical plane in a manner common to the art. The new web supply roll is mounted in the upper position and is rotated to the lower position after completion of a splice by indexing the support arm one half revolution in a clockwise direction. Located between the new web supply roll and the rotatable member 9 is a deflector roll 20 which is positioned to cause new web 11 to pass beneath the rotatable member 9 and above the splicing surface 14 without touching either one as shown in FIG. 3d. The end of the new web is fastened to the upper surface of the rotatable member. To the left of the splicing surface is a flanged entrance guide roll 21; to the right of the initial position of the rotatable member is a flanged exit guide roll 22. The guide rolls are positioned to guide an expiring web 23 being unwound from the expiring web supply roll 18 laterally between the flanges of the rotatable member and to support the web above the splicing surface but below the flat section 9b of the rotatable member. The distance between the flanges of the guide rolls is essentially equal to the width of the web.

In normal operation, an expiring web 23 is unwound from expiring web supply roll 18 and passes over entrance guide roll 21 and exit guide roll 22, the web being supported above the splicing surface 14 but below flat section 9b of the rotatable member. The web upon leaving the exit guide roll undergoes additional operations (not shown). While the expiring web is proceeding, the end of a new web 11 is fastened to the upper transfer surface of the rotatable member by means of a pressure-sensitive adhesive tape 12 from tape source 13, e.g., manually or by means of mechanical fingers, etc. The tape is fitted between the locating pins 10 which position the web as shown in FIG. 1 and FIG. 3a. The tape is placed with approximately half its length on the new web and the other half on the rotatable member.

As the end of the expiring web leaves the supply roll it passes over the entrance guide roll and comes into contact with the splicing surface 14, at section 14a. Upon reaching a predetermined point on the splicing surface, the vacuum source is activated and the web is held fast on the splicing surface of section 14a, but not on section 14b, the vacuum not having been applied to this latter section as yet. The end of the expiring web is subsequently trimmed with knife 16 and is removed manually or mechanically.

In its initial position, the rotatable member with the new web attached to its upper surface has the flat section 9b in a horizontal plane on the underside of the member. It is important that at the start the apparatus have its shafts, i.e., 3, 5 and 8, as well as the axes of the ring gear 1 and planet gear 6 in a common horizontal plane. Rotatable shaft 3 is rotated 180° in a clockwise direction (as shown in FIG. 1) by conventional drive means (not shown) causing the planet gear 6 to be driven half way around the inner circumference of stationary ring gear 1 but in a counterclockwise direction about the planet gear axis. As the planet gear rotates, a point on its pitch circle and initially situated on a horizontal diameter traces a straight line coincident with a horizontal diameter of the ring gear. A straight line is traced rather than a hypocycloid because, as described above, the pitch diameter of the planet gear is one-half the pitch diameter of the ring gear. Thus while the rotatable shaft makes one half revolution clockwise, the axis of the rotatable member, which is coincident with the pitch circle of the planet gear, traverses a straight line from the right to the left and is rotated 180° counterclockwise as shown in FIG. 3b. The end of the new web 11 is thereby placed into a position adjacent the trimmed end of the expiring web, and the pressure-sensitive tape has been doubled back on itself by the rotary action of the rotatable member as shown in the enlarged view of FIG. 9. Thus, a 180° bend or loop 12a is formed in the tape which extends somewhat to the right of the point of contact (P) between the rotatable member and the upper face of the web. As the rotatable member moves from right to left, slack will develop in the new web; this is of no consequence, however, since the rotatable member will place the end of the new web precisely in the required position as indicated above. If desired, however, the slack may be removed by simultaneously rewinding on the new supply roll.

In the instance shown in FIG. 3b, vacuum is applied to the left section 14b of the splicing surface preventing further motion of the end of the new web, and holding it stationary in abutment with the trimmed end of the expiring web. Further rotation of the rotatable member in a counterclockwise direction feeds the upper part of the loop of the adhesive tape to the right, stripping it from the surface of the rotatable member. This is known as "feed-out." The rotatable member is simultaneously being translated so that the point of contact between the rotatable member and the upper face of the web always remains to the left of loop 12a in the tape shown in FIG. 3b and enlarged FIG. 9a. The adhesive side of the tape is thus applied to the end of the expiring web forming the splice (see FIG. 3c); this is known as "wipe-on." The rotatable member continues to move to the right and rotate counterclockwise, returning to its initial position as shown in FIG. 3d. The rotatable shaft has completed one clockwise revolution at this point. Upon reaching its initial position, a limit switch or other type switch (not shown) can cause the vacuum in both sections of the splicing surface to be relieved thereby releasing the spliced web. The action of the switch may also simultaneously restore the machine to which the web is to be fed to operation, thus withdrawing the web from the new supply roll. The deflector roll 20 at this point serves to depress the web so that it will pass beneath the rotatable member wihout contact. At the resumption of machine operation, the support arm 19 indexes 180° to bring the new web supply roll into the position occupied by the expiring web supply roll. An empty spindle is presented so that another new web supply roll can be prepared for splicing by fastening it to the top of the rotatable member. The operation can then be repeated.

The above-described operation results in a butt-type splice; for such splices the groove 15 is located as shown in FIG. 3a where the dimension line D is equal to the pitch diameter of the ring gear 1. By shifting the splicing surface and knife mechanism to a position to the left of that shown in FIG. 1 and 3a, the new web end will be positioned on top of the end of the expiring web and to the right of the trimmed edge. Application of the tape will now result in a lap splice with the length of lap being equal to the distance the splicing surface was shifted.

The apparatus can be further modified by replacing the ring gear, planet gear, crank arm, etc., assembly with a double rack and pinion drive to achieve the above-described motion of the rotatable member. As shown in FIGS. 7a–d, in this type of drive the top rack 24 is translated from right to left (FIG. 7a) thereby translating to the left the rotatable member (not shown), the axis of which coincides with the axis of the pinion 25. The pinion and rotatable member keyed thereto are rotated 180° counterclockwise as the former rolls on the stationary lower rack 26 (FIG. 7b). Upon holding the upper rack stationary, the lower rack translates from the left to the right (FIG. 7c) translating the rotatable member from the left back to the right and causing a counterclockwise rotation of the pinion as it rolls on the upper rack. Both racks return to their original position simultaneously (FIG. 7d) producing a full clockwise rotation of the rotatable member but no translation. Both racks are translated by conventional drive means (not shown). In this embodiment, a different relationship between the length of tape "fed out" and length "wiped on" occurs than in the embodiment shown in FIG. 1.

"Feed out" and "wipe on" occur at the same rate and no loop is formed as shown in FIGS. 3b and 9a. To compensate for this and to insure that the bend in the tape is ahead of the point of tangency, the end of the new web is allowed to travel a small increment to the right of point P (see FIG. 9) such as by slightly delaying the activation of the left section of the splicing surface.

The rotatable member can be replaced by any of the rotatable members shown in FIGS. 4, 5 and 6. As shown in FIG. 4, a U-shaped locating fixture 27 attached rigidly to the machine frame (not shown) can be placed in juxtaposition to the rotatable member. In this embodiment, the fixture is positioned to locate the film axially and laterally, the tape holding the web in that position. In FIGS. 5 and 6, spring leaf inserts 28 and 29, respectively, are shown on the surface of the rotatable member. The embodiment of FIG. 5 forms a step against which the web end is positioned. The spring forms an extension of the surface of the rotatable member under load and also adds to the tape-wiping pressure. In the embodiment shown in FIG. 6, the leaf spring 29 depresses below the surface (FIG. 6a) to expose a step for placing the web. Care must be exercised to prevent the step from catching in the groove in the splicing surface and also from letting the spring extend out too far or it may tend to peel the tape from the surface of the rotatable member.

The embodiment of the apparatus shown in FIG. 8 is more suitable for splicing wide webs where the tape is placed transverse to the web rather than in a longitudinal direction. The major differences between this embodiment and that shown in FIG. 1 is that the rotatable member 9 has an auxiliary vacuum section 30 and knife groove fitted into its upper surface and does not require the cycloidal mechanism. A different knife arrangement for trimming the expiring web is also shown.

In operation, the rotatable member 9 of the FIG. 8 embodiment is initially located to the right of the knife groove 15 in the splicing surface 14 with its auxiliary vacuum section 30 uppermost. The rotatable member has a surface 30a which is essentially flat and parallel to the splicing surface in its initial position. The end of a new web 11 is placed over the rotatable member and is held stationary by the vacuum. The excess web is trimmed by passing a knife (not shown) through the auxiliary knife slot 31, and the pressure-sensitive tape 12 is laid transversely along the trimmed end to fasten it to the rotatable member. The width of the tape must be such that it does not extend beyond the end of surface 30a. After securely fastening the new web with the tape, the auxiliary vacuum section is de-energized. As described previously above, when the trailing end of the expiring web has been clamped by the right vacuum section of the splicing surface and the knife 16 has been used to trim the trailing end, the rotatable member is translated to the left (from point A to point B) and rotated counterclockwise 180° to bring the end of the new web into a position adjacent the expiring web and to bring section 30a in juxtaposition to the left vacuum section 14b. Following activation of the left vacuum section to hold the new web, the rotatable surface is then translated without further rotation to the right (point A′) to "wipe-on" the pressure-sensitive tape on the expiring web and to complete the splice. A clockwise rotation of 180° returns the rotatable member to its original position (A) and resets the mechanism.

In a preferred embodiment of the invention a stop is provided for the rotatable member. As shown in FIG. 1, a notched plate 32, e.g., having two notches spaced 180° apart, is secured to shaft 3. A dog 33 which slides in a part of the machine frame (not shown) fits into the notches of the notched plate to prevent the shaft 3 from further rotation. The dog can be activated by means of a solenoid 34 as illustrated or by other suitable means and synchronized with the apparatus driving means (not shown). By way of illustration, when the driving means attached to shaft 3 is energized, the solenoid is momentarily energized to disengage the dog from a notch. After rotation of 180°, the dog is pushed (such as by a spring) into the notch and the driving means is de-energized. A stepping motor system can be used in place of the notch at the 180° position on the notched plate.

It is to be understood that embodiments of the various components of the apparatus other than those described above can readily be determined by those skilled in the art. For example, variations in the web supply means can be used including those means which are commercially available. In addition, the web-guiding means can be altered with the proviso that the web does not unnecessarily contact or scrape components of the apparatus.

The apparatus of this invention are useful in splicing flexible webs of varying thickness without damage, e.g., by scratching or "kinking." A variety of splices can be made, e.g., butt and lap. The webs can be made of the same or different chemical composition, such as hydrophobic cellulose derivative, e.g., cellulose acetate, cellulose triacetate, cellulose propionate, cellulose butyrate, cellulose-acetate-butyrate, etc., a superpolymer such as nylon, polyvinyl chloride, polyester, e.g., polyethylene terephthalate, polyethylene terephthalate-isophthalate, polycarbonate, etc. The pressure-sensitive adhesive tape used to make the splice can be any commercially available tape.

An advantage of the apparatus of this invention is that it provides means for semi-automatically forming a temporary splice between a new web and an expiring web. Another advantage is that it provides a rapid, efficient means for making splices wherein the manual operations are extremely simple. A further advantage is that the splice can be prepared in complete darkness safely and reliably. Yet a further advantage is that webs of different types can be spliced together utilizing a pressure-sensitive adhesive tape. Still a further advantage is that the positioning of the webs to be spliced by mechanical means is extremely accurate. A further advantage is that the apparatus is versatile and can be utilized to prepare several types of splices. Still further advantages will be apparent to those skilled in the art.

What is claimed is:

1. A method of splicing the lead end of a new web to the trailing end of an expiring web which comprises: (1) supporting said trailing end on a splicing surface, (2) attaching said lead end to a transfer surface with an adhesive tape member having part of its adhesive surface on said lead end and part on said transfer surface, (3) positioning said transfer surface to a position where said lead end is adjacent said trailing end and said tape member is folded back on itself forming a loop therein, (4) releasably securing said lead end on a splicing surface, and (5) moving said transfer surface along the expiring web and continuously feeding the upper part of said loop in the direction of movement thereby progressively transferring the adhesive surface of said tape member from contact with said transfer surface around said loop and into contact with said expiring web.

2. An apparatus for splicing the lead end of a new web to the trailing end of an expiring web which comprises: (1) a splicing surface for releasably holding said trailing end for splicing, (2) an arcuate transfer surface for supporting a lead end of a new web attached to said transfer surface by an adhesive tape member having part of its surface on said lead end and part on said transfer surface, (3) positioning means in engagement with said transfer surface to position the latter adjacent said splicing surface with said lead end adjacent said trailing end and said tape member folded back on itself forming a loop therein, (4) means for releasably securing said lead end of said new web to a splicing surface, and (5) means for moving said transfer surface along said expiring web thereby continuously feeding the upper part of said loop in the direction of movement progressively transferring the adhesive surface of said tape member from contact with said transfer surface around said loop and into contact with said expiring web.

3. An apparatus as defined in claim 2, wherein said splicing surface (1) is provided with web cutting means.

4. An apparatus as defined in claim 2 wherein said splicing surface is activatable by vacuum.

5. An apparatus as defined in claim 2 wherein said arcuate transfer surface is fitted with laterally spaced, radially retractable locating pins.

6. An apparatus as defined in claim 2 wherein said arcuate transfer surface is fitted with a juxtaposed U-shaped, ridged web-locating fixture, said fixture being stationary.

7. An apparatus as defined in claim 2 wherein said arcuate transfer surface is fitted with a web-locating spring leaf insert.

8. An apparatus as defined in claim 2 wherein said means (3) and (5) comprise a double rack and pinion drive.

9. An apparatus as defined in claim 2 wherein said means (3) and (5) comprise a crank arm, a rotatable shaft keyed to one side of said crank arm, a rotatable planet shaft journaled in the opposite side of said crank arm, a planet gear operatively connected to said planet shaft, a ring gear in driving relationship with said planet gear, and a fixed shaft connected to said planet gear and secured operatively to said transfer surface, said means characterized by having the following relationship wherein (a) the pitch diameter of said planet gear is one-half the pitch diameter of said ring gear;

(b) the radial distance between the axes of said rotatable shaft and said rotatable planet shaft equals one-fourth of the pitch diameter of said ring gear; and (c) the radial distance between the axes of said rotatable planet shaft and said fixed shaft equals one-fourth of the pitch diameter of said ring gear.

10. An apparatus for splicing the lead end of a new web to the trailing end of an expiring web which comprises: (1) a splicing surface for releasable holding said trailing end of the expiring web, (2) a transfer surface means for transporting and transferring said leading end by releasably adhering said leading end upon its surface with an adhesive, (3) positioning means in engagement with said transfer surface to rotate the latter while forcing the transfer surface to translate over said splicing surface which holds said expiring web, and (4) means for releasably securing said new web to said splicing surface after said transfer surface rotates said lead end into position adjacent to said expiring web.

References Cited by the Examiner

UNITED STATES PATENTS

| | | | |
|---|---|---|---|
| 1,623,277 | 4/1927 | Scott | 242—58.4 |
| 1,693,436 | 11/1928 | Drange | 242—58.4 |
| 2,195,008 | 3/1940 | Lessmann | 242—78.1 |
| 2,435,376 | 2/1948 | Wilcoxon | 156—504 |
| 2,606,136 | 8/1952 | Garrett et al. | 156—504 |
| 2,706,515 | 4/1955 | Evers | 156—504 |
| 2,724,426 | 11/1955 | Beil et al. | 156—159 |
| 2,745,464 | 5/1956 | Auerbacher et al. | 156—504 |
| 2,998,843 | 9/1961 | Grear et al. | 156—502 XR |
| 3,035,787 | 5/1962 | Ota et al. | 242—58.4 |

EARL M. BERGERT, *Primary Examiner.*

L. M. MARTIN, *Examiner.*